(12) United States Patent
Li (10) Patent No.: US 11,950,066 B2
(45) Date of Patent: Apr. 2, 2024

(54) TWS EARPHONE INTERACTION METHOD AND SYSTEM USING RESIDUAL SLOTS

(71) Applicants: VeriSilicon Microelectronics (Shanghai) Co., Ltd., Shanghai (CN); VeriSilicon Holdings Co., Ltd., Cayman Islands (KY)

(72) Inventor: Maogang Li, Shanghai (CN)

(73) Assignees: VeriSilicon Microelectronics (Shanghai) Co., Ltd., Shanghai (CN); VeriSilicon Holdings Co., Ltd., Cayman Islands (KY)

( * ) Notice: Subject to any disclaimer, the term of this patent is extended or adjusted under 35 U.S.C. 154(b) by 326 days.

(21) Appl. No.: 17/355,118

(22) Filed: Jun. 22, 2021

(65) Prior Publication Data
US 2021/0400389 A1   Dec. 23, 2021

(30) Foreign Application Priority Data
Jun. 22, 2020   (CN) .......................... 202010573796.5

(51) Int. Cl.
| | |
|---|---|
| H04R 3/12 | (2006.01) |
| H04L 1/16 | (2023.01) |
| H04L 65/60 | (2022.01) |
| H04L 65/613 | (2022.01) |
| H04R 1/10 | (2006.01) |
| H04R 5/033 | (2006.01) |
| H04W 4/80 | (2018.01) |
| H04W 56/00 | (2009.01) |
| H04W 72/0446 | (2023.01) |

(52) U.S. Cl.
CPC ................. *H04R 3/12* (2013.01); *H04L 1/16* (2013.01); *H04L 65/60* (2013.01); *H04R 5/033* (2013.01); *H04W 4/80* (2018.02); *H04R 2420/07* (2013.01)

(58) Field of Classification Search
None
See application file for complete search history.

(56) References Cited

U.S. PATENT DOCUMENTS

| | | | |
|---|---|---|---|
| 10,244,307 B1 * | 3/2019 | Tong | H04R 1/1091 |
| 2019/0159002 A1 * | 5/2019 | Huang | H04W 88/16 |
| 2021/0337297 A1 * | 10/2021 | Hsieh | H04R 1/1033 |
| 2021/0337610 A1 * | 10/2021 | Yu | H04W 4/80 |
| 2023/0030553 A1 * | 2/2023 | Haartsen | H04W 76/19 |

\* cited by examiner

*Primary Examiner* — Qin Zhu
(74) *Attorney, Agent, or Firm* — IPRTOP LLC (57) ABSTRACT

The present disclosure provides a TWS earphone interaction method and system, and TWS earphones. When a main earphone and a secondary earphone receive a data packet sent by an audio source, within a residual slot of a data transmission slot, the main earphone and the secondary earphone can perform data interaction, wherein the residual slot is the remaining data transmission slot after the data packet is transmitted. When a data packet is received, the main earphone sends acknowledgment information to the audio source, within a residual slot of a next data transmission slot, the main earphone and the secondary earphone can perform data interaction, wherein the residual slot is the remaining of the next data transmission slot after the acknowledgment information is sent.

9 Claims, 5 Drawing Sheets

```
┌─────────────────────────────────────────────────────────┐
│   when the main earphone and the secondary earphone receive a data   │
│       packet sent by an audio source, within a residual slot of a data      │  S1
│   transmission slot, the main earphone and the secondary earphone can │
│   perform data interaction, wherein the residual slot is resulted after the  │
│                      data packet is transmitted                      │
└─────────────────────────────────────────────────────────┘
                              │
                              ▼
┌─────────────────────────────────────────────────────────┐
│        when a data packet is received, the main earphone sends        │  S2
│      acknowledgment information to the audio source, within a residual      │
│        slot of a next data transmission slot, the main earphone and the      │
│         secondary earphone can perform data interaction, wherein the        │
│   residual slot is resulted after the acknowledgment information is sent    │
└─────────────────────────────────────────────────────────┘
                              │
                              ▼
┌─────────────────────────────────────────────────────────┐
│        when a data packet is received, the main earphone sends        │  S3
│      acknowledgment information to the audio source, within a residual      │
│        slot of a next data transmission slot, the main earphone and the      │
│         secondary earphone can perform data interaction, wherein the        │
│    residual slot is resulted after the acknowledgment information and    │
│                        extra information is sent                       │
└─────────────────────────────────────────────────────────┘
                              │
                              ▼
┌─────────────────────────────────────────────────────────┐
│   when the main earphone does not correctly receive audio data sent   │  S4
│        by the audio source, within a residual slot of a next data        │
│    transmission slot, the main earphone and the secondary earphone    │
│    can perform data interaction, wherein the residual slot is resulted the  │
│       next data transmission slot minus a feedback time of the main       │
│                               earphone                               │
└─────────────────────────────────────────────────────────┘
```

TWS EARPHONE INTERACTION METHOD AND SYSTEM USING RESIDUAL SLOTS

CROSS REFERENCE TO RELATED APPLICATION

The present application claims the benefit of priority to Chinese Patent Application No. CN 2020105737965, entitled "TWS EARPHONE INTERACTION METHOD AND SYSTEM, AND TWS EARPHONES", filed with CNIPA on Jun. 22, 2020, the disclosure of which is incorporated herein by reference in its entirety.

FIELD OF TECHNOLOGY

The present invention relates to the wireless earphones, in particular to a true wireless stereo (TWS) earphone interaction method and system, and TWS earphones.

BACKGROUND

With the development of Bluetooth technology and the widespread use of Bluetooth products, Bluetooth wireless earphones are becoming a necessity for everyday life. Because TWS earphones are easy to carry and wear, they are getting more and more popular.

For TWS earphones, the design difficulty lies in how the left and right earphones can receive Bluetooth signals at the same time, and how to maintain synchronization. Since TWS earphones need to synchronize Bluetooth information received from audio sources such as mobile phones, in order to ensure synchronization between the left and right earphones, the left and right earphones need to perform data interaction. In the prior art, the data interaction between the left and right earphones usually requires additional Bluetooth slots, which hinders effective utilization of Bluetooth communication slots, and limits effective communication between Bluetooth devices in a Bluetooth network, thereby making Bluetooth devices inapplicable in some scenarios.

SUMMARY

The present invention provides a TWS earphone interaction method and system, and the TWS earphones uses idle time in Bluetooth slots to carry out information interaction between the primary and secondary headsets, which effectively saves Bluetooth slot resources and ensures the low latency of information interaction.

The present invention provides a TWS earphone interaction method. The TWS earphones include a main earphone and a secondary earphone. The method includes: when the main earphone and the secondary earphone receive a data packet sent by an audio source, within a residual slot of a data transmission slot, the main earphone and the secondary earphone can perform data interaction, wherein the residual slot is resulted after the data packet is transmitted; when a data packet is received, the main earphone sends acknowledgment information to the audio source, within a residual slot of a next data transmission slot, the main earphone and the secondary earphone can perform data interaction, wherein the residual slot is resulted after the acknowledgment information is sent; when a data packet is received, the main earphone sends acknowledgment information to the audio source, within a residual slot of a next data transmission slot, the main earphone and the secondary earphone can perform data interaction, wherein the residual slot is resulted after the acknowledgment information and extra information is sent; when the main earphone does not correctly receive audio data sent by the audio source, within a residual slot of a next data transmission slot, the main earphone and the secondary earphone can perform data interaction, wherein the residual slot is resulted the next data transmission slot minus a feedback time of the main earphone;

In one embodiment, interactive data transmitted between the main earphone and the secondary earphone includes one or more of received signal strength, signal-to-noise ratio, packet error rate, timing information, control information, customized data package/function package, audio data, audio data synchronization information, and data indicating whether or not the audio data is received correctly.

In one embodiment, based on durations of the residual slots, and the timing and period of the interactive data, the interactive data is determined to be of a certain type.

In one embodiment, an RF frequency point, and receiving and sending time points of the interactive data are determined based on durations of the residual slots and the type of the interactive data.

In one embodiment, the feedback time of the main earphone is equal to the duration used by the main earphone to send the acknowledgment information.

In one embodiment, the communication between the main earphone and the secondary earphone is based on a Bluetooth protocol or a non-Bluetooth protocol.

The present disclosure provides TWS earphones, which include a main earphone and a secondary earphone.

The main earphone and the secondary earphone are used for data interaction in one or more residual slots as follows:
1) when the main earphone and the secondary earphone receive a data packet sent by an audio source, within a residual slot of a data transmission slot, wherein the residual slot is resulted after the data packet is transmitted;
2) when a data packet is received, the main earphone sends acknowledgment information to the audio source, within a residual slot of a next data transmission slot, wherein the residual slot is resulted after the acknowledgment information is sent;
3) when a data packet is received, the main earphone sends acknowledgment information to the audio source, within a residual slot of a next data transmission slot, wherein the residual slot is resulted after the acknowledgment information and extra information is sent;
4) when the main earphone does not receive audio data sent by the audio source correctly.

In one embodiment, interactive data transmitted between the main earphone and the secondary earphone includes one or more of received signal strength, signal-to-noise ratio, packet error rate, timing information, control information, customized data package/function package, audio data, audio data synchronization information, and data indicating whether or not the audio data is received correctly.

In one embodiment, based on durations of the residual slots, and the timing and period of the interactive data, the interactive data is determined to be of a certain type; an RF frequency point, and receiving and sending time points of the interactive data are determined based on durations of the residual slots and the type of the interactive data.

The present disclosure provides a TWS earphone interaction system, including the above mentioned TWS earphones and audio source.

The audio source sends data packages to the TWS earphone.

The TWS earphone interaction method, system, and TWS earphones according to present disclosure have the following beneficial effects:

(1) Using the idle time in Bluetooth slots to carry out information interaction between the main and secondary headsets, without occupying additional slots, can effectively save Bluetooth slot resources, so that a Bluetooth network can accommodate more Bluetooth devices for communication, thereby avoiding conflicts.

(2) The method does not affect the slots of Bluetooth wireless communication itself, which ensures the low delay of data interaction;

(3) The interaction between the main and auxiliary earphones can be performed in a timely and efficient manner, effectively avoiding communication abnormalities due to the lack of timely data interaction.

REFERENCE NUMERALS

| | |
|---|---|
| 51 | main earphone |
| 52 | secondary earphone |
| 61 | TWS earphones |
| 62 | audio source |

DETAILED DESCRIPTION

The following describes the implementation of the present disclosure through specific examples, and those skilled in the art can easily understand other advantages and effects of the present disclosure from the content disclosed in this specification. The present disclosure can also be implemented or applied through other different specific embodiments. Various details in this specification can also be modified or changed based on different viewpoints and applications without departing from the spirit of the present disclosure. It should be noted that the following embodiments and the features in the embodiments can be combined with each other if no conflict will result.

It should be noted that the drawings provided in this disclosure only illustrate the basic concept of the present invention in a schematic way, so the drawings only show the components related to the present invention. The drawings are not necessarily drawn according to the number, shape and size of the components in actual implementation; during the actual implementation, the type, quantity and proportion of each component can be changed as needed, and the components' layout may also be more complicated.

The present invention provides a TWS earphone interaction method and system, and TWS earphones, which uses idle time in Bluetooth slots to carry out data interaction between the main and secondary earphones, which effectively saves Bluetooth slot resources and ensures the low latency of data interaction.

The TWS earphones include a main earphone and a secondary earphone, wherein the main earphone can communicate with an audio source, the secondary earphone can communicate with the main earphone, and finally the playback of audio data provided by the audio source can be achieved through the main earphone and secondary earphone. Specifically, the main earphone and the secondary earphone are matched, the communication between the main earphone and the secondary earphone is based on a Bluetooth protocol or a non-Bluetooth protocol, and at the same time, the main earphone and the audio source establish a standard Bluetooth connection. When the audio source plays audio, the main earphone acquires Bluetooth parameters for establishing a Bluetooth connection with the audio source, and subsequently receives data packets sent by the audio source based on the Bluetooth parameters.

The secondary earphone obtains the Bluetooth parameters from the main earphone, establishes a Bluetooth connection with the audio source device, and subsequently receives data packets sent by the audio source device based on the Bluetooth parameters without the need of the main earphone forwarding the data packets to it. If the secondary earphone does not acquire the Bluetooth parameters from the primary earphone, the primary earphone may forward the data packets acquired from the audio source to the secondary earphone. The audio source is used to provide audio data. In one embodiment, the audio source device includes one or more of a smart phone, a smart speaker, an IPAD, and a personal computer.

Figure 1:
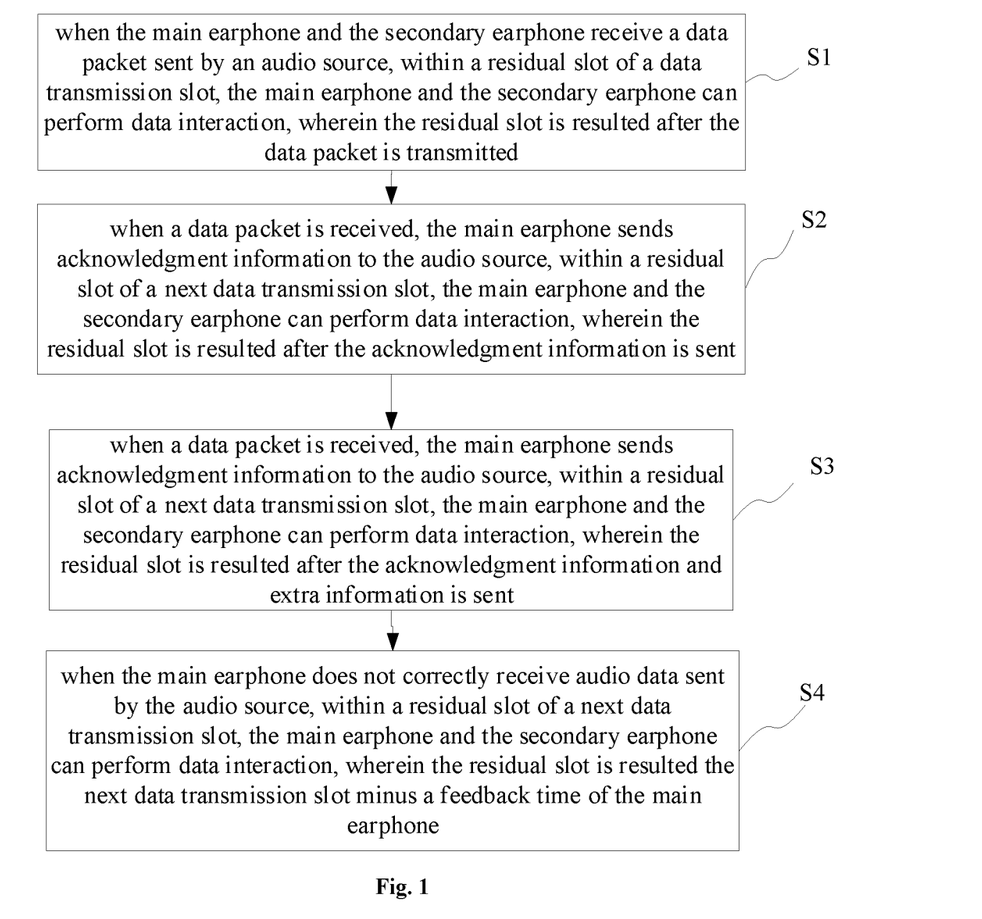
FIG. 1 shows a flowchart of an embodiment of a TWS earphone interaction method of the present disclosure.

As shown in FIG. 1, the present disclosure provides a TWS earphone interaction method, which includes:

S1: when the main earphone and the secondary earphone receive a data packet sent by an audio source, within a residual slot of a data transmission slot, the main earphone and the secondary earphone can perform data interaction, wherein the residual slot is the remaining part of the data transmission slot after the data packet is transmitted.

Specifically, according to a standard Bluetooth protocol, a "slot" represents the minimum transceiver switching interval between master and slave devices in Bluetooth technology, which may be 625 us. Data packets are transmitted between the main earphone and the audio source in units of data transmission slots. The transmission of a data packet occupies multiple slots, that is, a data packet transmission slot can comprise one or more slots. For example, when the main earphone receives data packets from the audio source, and each data packet occupies 1 or 3 or 5 slots, then after the data packets are transmitted, in the last slot of the data transmission time slot there will be a residual slot of about 200 us. In other words, the residual slot may be the remaining time available in a standard transmission slot after the transmission or receiving of the data packets are completed.

Figure 2:
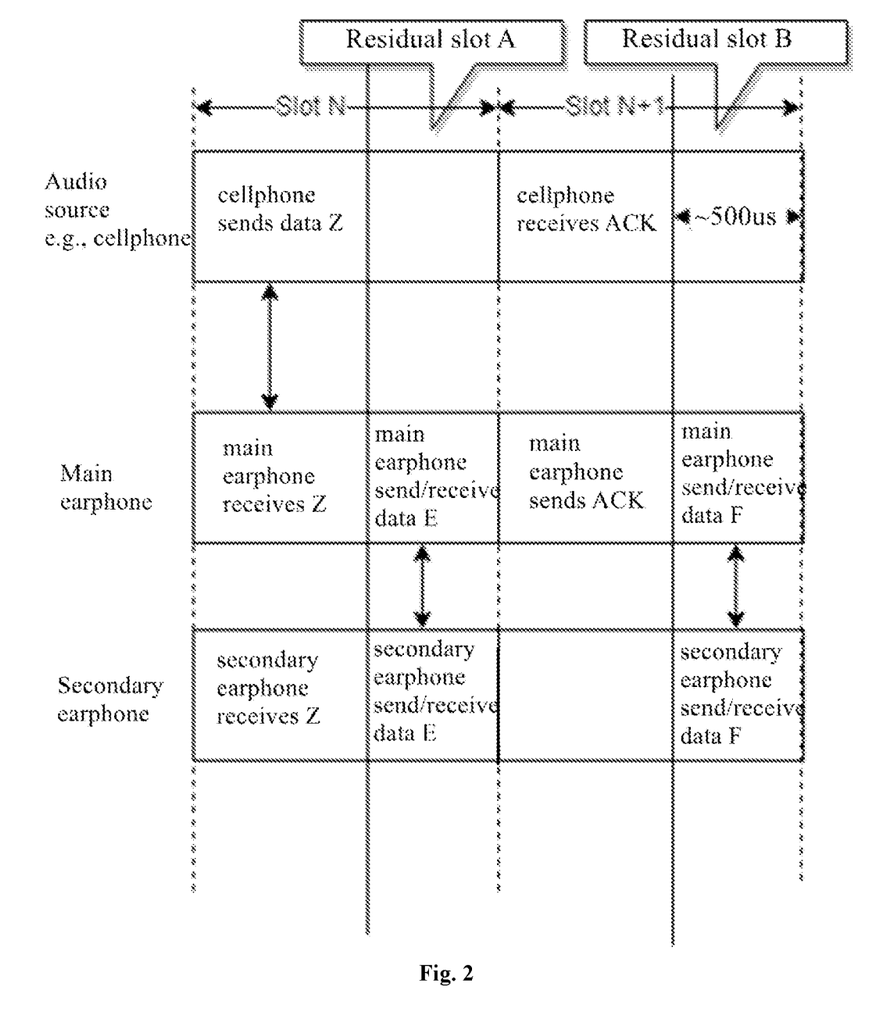
FIG. 2 shows a timing diagram of a first embodiment of a TWS earphone interaction method of the present disclosure.
Figure 3:
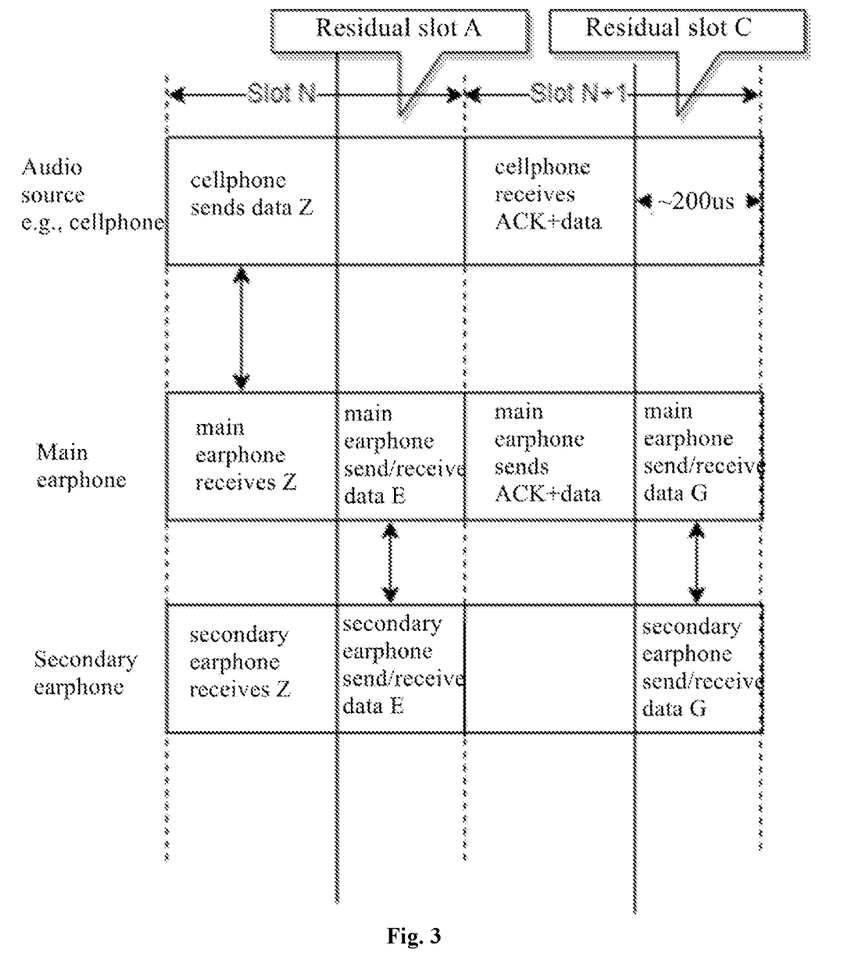
FIG. 3 shows a timing diagram of a second embodiment of a TWS earphone interaction method of the present disclosure.
Figure 4:
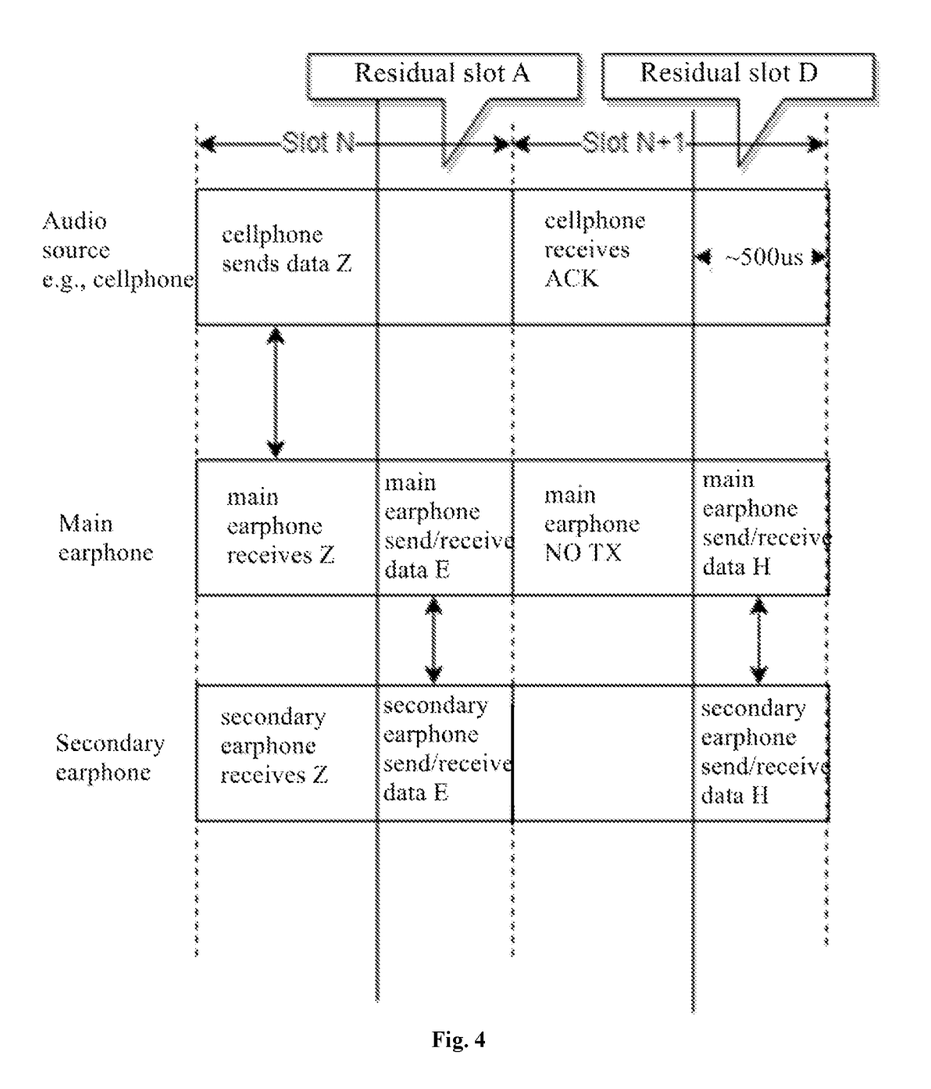
FIG. 4 shows a timing diagram of a third embodiment of a TWS earphone interaction method of the present disclosure.

As shown in FIG. 2 to FIG. 4, when the data transmission slot occupies one Slot N, and the audio source sends data Z, after the main earphone and the secondary earphone have received the data Z, in Slot N there exists a residual slot A. In the residual slot A, the main earphone and the secondary earphone are able to perform data interaction: that is, the main earphone can send/receive data E, and the secondary earphone can send/receive data E.

S2: when a data packet is received, the main earphone sends acknowledgment information to the audio source, within a residual slot of a next data transmission slot, the main earphone and the secondary earphone can perform data interaction, wherein the residual slot is the remaining part of the next data transmission slot after the acknowledgment information is sent.

Specifically, the number of slots occupied by the data packet of the acknowledgment information is 1; the residual slot is the data transmission slot minus the acknowledgment information, and the residual slot has duration of nearly 500 us As shown in FIG. 2, in Slot N, the audio source sends data Z, and after the main earphone and the secondary earphone have received the data Z, in the next data transmission time Slot, namely Slot N+1, the main earphone needs to send acknowledgment information ACK to the audio source, so that the audio source confirms the receipt of the data Z. If no extra information is sent to the audio source from the main earphone except for the acknowledgment information ACK, the main earphone only needs to send a NULL packet to the audio source. At this time, the data transmission slot N+1 has a residual slot of nearly 500 us. To utilize this residual slot B, the main earphone and the secondary earphone may perform data interaction: that is, the main earphone can send/receive data F and the secondary earphone can send/receive data F.

S3: when a data packet is received, the main earphone sends acknowledgment information to the audio source, within a residual slot of a next data transmission slot, the main earphone and the secondary earphone can perform data interaction, wherein the residual slot is the remaining part of the next data transmission slot after the acknowledgment information and extra information is sent.

Specifically, the data packet of the acknowledgment information and the extra information may need to occupy 1, 3, or 5 slots; and the residual slot will be the remaining part of the last slot. In one example, if the data packet of the acknowledgment information and extra information occupies one slot (for example, the slot number is N+1), then the residual slot is the last approximately 200 us of the N+1 slot. In another example, if the data packet of the acknowledgment information and extra information occupies 3 slots (for example, the slot numbers are N+1, N+2, N+3), then the residual slot is the last approximately 200 us of the N+3 slot. In a further example, if the data packet of the acknowledgment information and extra information occupies 5 slots (for example, the slot numbers are N+1, N+2, N+3, N+4, N+5), then the residual slot is the last approximately 200 us of the N+5 slot.

As shown in FIG. 3, and as an example, the data transmission time slot occupies a single slot. In slot N, the audio source sends data Z, and after the main earphone and the secondary earphone have received the data Z, in the next data transmission time slot, namely slot N+1, the main earphone needs to send acknowledgment information ACK to the audio source, so that the audio source confirms the receipt of the data Z. The main earphone can also send extra information to the audio source. If no extra information is sent to the audio source from the main earphone except for the acknowledgment ACK and the extra information, there exists a residual slot C of nearly 200 us in the slot N+1. In the residual slot C, the main earphone and the secondary earphone are able to perform data interaction. That is, the main earphone can send/receive data G, and the secondary earphone can send/receive data G in this residual slot C.

S4: when the main earphone does not correctly receive audio data sent by the audio source, within a residual slot of a next data transmission slot, the main earphone and the secondary earphone can perform data interaction, wherein the residual slot is the remaining part of the next data transmission slot minus a feedback time of the main earphone.

Specifically, the number of slots occupied by the feedback time of the main earphone is 1, the corresponding residual slot is the slot occupied by the feedback time minus the actual feedback time of the main earphone, and the residual slot has a duration of nearly 500 us.

As shown in FIG. 4, in slot N, the audio source sends data Z, and if the main earphone and/or the secondary earphone do not receive the data Z correctly, in the next data transmission slot N+1, the main earphone does not send any information to the audio source, so that the audio source device can confirm that the data Z has not been received correctly. At this time, in the residual slot D, which is data transmission slot N+1 minus the feedback time of the main earphone, and the main earphone and the auxiliary earphone can perform data interaction. That is, the main earphone can send/receive data H, and the secondary earphone can send/receive data H. The feedback time is used for the main earphone to send feedback information indicating data receiving status to the audio source, if the data packet is received correctly, acknowledge information ACK is sent to the audio source; if the data packet is not received correctly, no information is sent to the audio source. Therefore, the slot N+1 could all be used for data interaction between the main and secondary earphones.

Since the secondary earphone receives no information regarding whether the main earphone needs to send acknowledge information to the audio source at this time, the residual slot that can actually be utilized is still about 500 us. If the main and secondary earphones receive information indicating that the other one has not received data from the audio source correctly, through the aforementioned residual slots or other methods, the residual slot that can actually be utilized will be an entire slot of 625 us. In one embodiment, the feedback time of the main earphone is equal to the duration used by the main earphone to send the acknowledgment information.

Therefore, in the four situations mentioned above, the main earphone and the secondary earphone are using residual slots for data interaction. In one embodiment, interactive data transmitted between the main earphone and the secondary earphone includes one or more of received signal strength, signal-to-noise ratio, packet error rate, timing information, control information, customized data package/function package, audio data, audio data synchronization information, and data indicating whether or not the audio data is received correctly.

In one embodiment, based on durations of the residual slots, and the timing and period of the interactive data, the interactive data is determined to be of a certain type.

In one embodiment, an RF frequency point, and receiving and sending time points of the interactive data are determined based on durations of the residual slots and the type of the interactive data. The RF frequency point of the interactive data may be the same as the frequency point of the data packets sent by the audio source, or may be different from the frequency point of the data packets sent by the audio source. By selecting the appropriate frequency point, the time consumption caused by the RF frequency point switching is reduced, and the utilization of the slots can be maximized.

In an embodiment of the present invention, the specific format and package form of the interactive data between the main earphone and the secondary earphone can be determined according to needs, a Bluetooth data packet format can be used, or the data can be formatted customarily according to actual situations.

Figure 5:
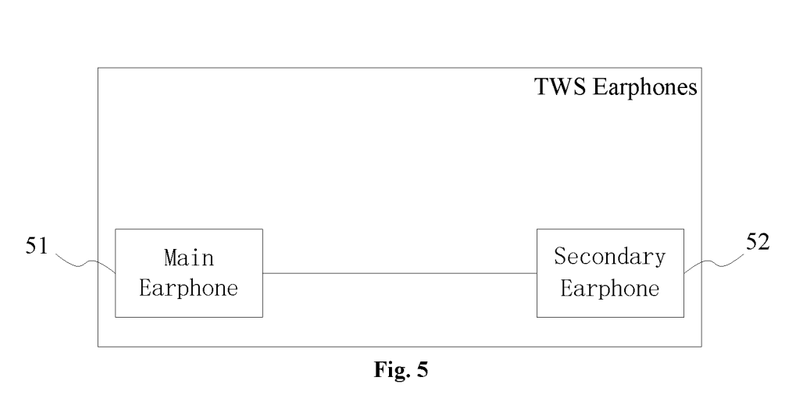
FIG. 5 shows a structural diagram of an embodiment of TWS earphones of the present disclosure.

As shown in FIG. 5, in one embodiment, the TWS earphones of the present invention include a main earphone 51 and a secondary earphone 52.

The main earphone and the secondary earphone are used for data interaction in one or more residual slots as follows:
1) when the main earphone and the secondary earphone receive a data packet sent by an audio source, within a residual slot of a data transmission slot, wherein the residual slot is a part of the data transmission slot after the data packet is transmitted;
2) when a data packet is received, the main earphone sends acknowledgment information to the audio source, within a residual slot of a next data transmission slot, wherein the residual slot is a part of the next data transmission slot after the acknowledgment information is sent;
3) when a data packet is received, the main earphone sends acknowledgment information to the audio source, within a residual slot of a next data transmission slot, wherein the residual slot is a part of the next data transmission slot after the acknowledgment information and extra information is sent;
4) when the main earphone does not receive audio data sent by the audio source correctly.

In one embodiment, interactive data transmitted between the main earphone and the secondary earphone includes one or more of received signal strength, signal-to-noise ratio, packet error rate, timing information, control information, customized data package/function package, audio data, audio data synchronization information, and data indicating whether or not the audio data is received correctly.

In one embodiment, based on durations of the residual slots, and the timing and period of the interactive data, the interactive data is determined to be of a certain type.

In one embodiment, an RF frequency point, and receiving and sending time points of the interactive data are determined based on durations of the residual slots and the type of the interactive data. The RF frequency point of the interactive data may be the same as the frequency point of the data packets sent by the audio source, or may be different from the frequency point of the data packets sent by the audio source. By selecting the appropriate frequency point, the time consumption caused by the RF frequency point switching is reduced, and the utilization of the slots can be maximized.

In an embodiment of the present invention, the specific format and package form of the interactive data between the main earphone and the secondary earphone can be determined according to needs, a Bluetooth data packet format can be used, or the data can be formatted customarily according to actual situations.

Figure 6:
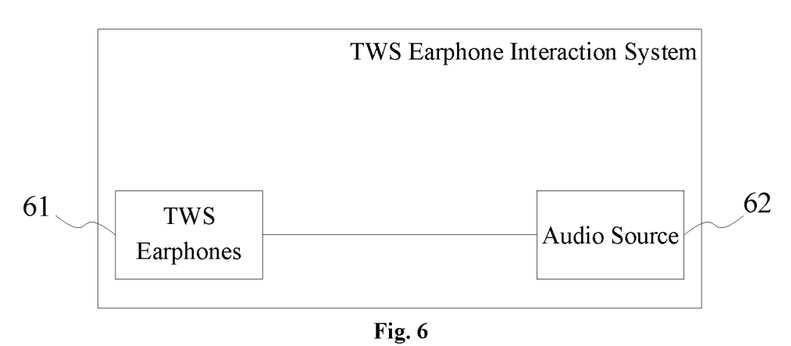
FIG. 6 shows a structural diagram of an embodiment of a TWS earphone interaction system of the present disclosure.

As shown in FIG. 6, the present disclosure provides a TWS earphone interaction system, including the above mentioned TWS earphones 61 and audio source 62.

The audio source 62 is communicatively connected to the TWS earphones 61 and sends data packages to the TWS earphones 61.

In one embodiment, the audio source device includes one or more of a smart phone, a smart speaker, an IPAD, and a personal computer.

In summary, the TWS earphone interaction method and system, and the TWS earphones use idle time in Bluetooth time slots to carry out data interaction between the main and secondary earphones, without occupying additional time slots, and can effectively save Bluetooth time slot resources, so that a Bluetooth network can accommodate more Bluetooth devices for communication, thereby avoiding conflicts; the method does not affect the time slots of Bluetooth wireless communication itself, which ensures the low latency of data interaction; the interaction between the main and auxiliary earphones can be performed in a timely and efficient manner, effectively avoiding communication abnormalities due to the lack of timely data interaction. Therefore, the present invention effectively overcomes various shortcomings in the prior art and has a high industrial value.

The above-mentioned embodiments only exemplarily illustrate the principles and effects of the present invention, but are not used to limit the present invention. Anyone familiar with this technology can modify or change the above-mentioned embodiments without departing from the spirit and scope of the present invention. Therefore, all equivalent modifications or changes made by those skilled in the art without departing from the spirit and technical concepts disclosed by the present disclosure should still be covered by the attached claims of the present disclosure.

What is claimed is:

1. A TWS earphone interaction method, wherein the TWS earphones comprise a main earphone and a secondary earphone, wherein the method comprises:
   when the main earphone and the secondary earphone receive a data packet sent by an audio source, performing, by the main earphone and the secondary earphone, data interaction within a first residual slot of a first data transmission slot, wherein the first residual slot is a remaining of the first data transmission slot after the data packet is transmitted;
   when a data packet is received and the main earphone sends acknowledgment information to the audio source, performing, by the main earphone and the secondary earphone, data interaction within a second residual slot of a first next data transmission slot, wherein the second residual slot is a remaining of the first next data transmission slot after the acknowledgment information is sent;
   when a data packet is received and the main earphone sends acknowledgment information and extra information to the audio source, within a residual slot of a second next data transmission slot, performing, by the main earphone and the secondary earphone, data interaction within a third residual slot of a second next data transmission slot, wherein the residual slot is a remaining of the second next data transmission slot after the acknowledgment information and extra information is sent; and
   when the main earphone does not correctly receive audio data sent by the audio source, performing, by the main earphone and the secondary earphone, data interaction within a fourth residual slot of a third next data transmission slot, wherein the fourth residual slot is remaining of the third next data transmission slot minus a feedback time of the main earphone;
   wherein the feedback time of the main earphone is equal to the duration used by the main earphone to send the acknowledgment information.

2. The TWS earphone interaction method according to claim 1, wherein interactive data transmitted between the main earphone and the secondary earphone includes one or more of received signal strength, signal-to-noise ratio, packet error rate, timing information, control information, customized data package/function package, audio data, audio data synchronization information, and data indicating whether or not the audio data is received correctly.

3. The TWS earphone interaction method according to claim 2, wherein based on durations of the first, second, third, or fourth residual slots, and the timing and period of the interactive data, the interactive data is determined to be of a certain type.

4. The TWS earphone interaction method according to claim 2, wherein based on durations of the first, second, third or fourth residual slots and the type of the interactive data, an RF frequency point of the interactive data and receiving and sending time points of the interactive data are determined.

5. The TWS earphone interaction method according to claim 1, wherein communication between the main earphone and the secondary earphone is based on a Bluetooth protocol or a non-Bluetooth protocol.

6. TWS earphones, comprising a main earphone and a secondary earphone,
wherein the main earphone and the secondary earphone use one or more residual slots for data interaction as follows:
1) When the main earphone and the secondary earphone receive a data packet sent by an audio source, the main earphone and the secondary earphone use a first residual slot of a data transmission slot, wherein the first residual slot is remaining of the data transmission slot after the data packet is transmitted;
2) When a data packet is received and the main earphone sends acknowledgment information to the audio source, the main earphone and the secondary earphone use a second residual slot of a first next data transmission slot, wherein the second residual slot is a remaining of the first next data transmission slot after the acknowledgment information is sent;
3) When a data packet is received and the main earphone sends acknowledgment information and extra information to the audio source, the main earphone and the secondary earphone use a third residual slot of a second next data transmission slot, wherein the third residual slot is a remaining of the second next data transmission slot after the acknowledgment information and the extra information is sent; and
4) When the main earphone does not receive audio data sent by the audio source correctly, the main earphone and the secondary earphone use a fourth residual slot which is a remaining of a third data transmission slot;
wherein based on durations of the residual slots, and timing and period of the interactive data transmitted between the main earphone and the secondary earphone, the interactive data is determined to be of a certain type.

7. The TWS earphones according to claim 6, wherein the interactive data transmitted between the main earphone and the secondary earphone includes one or more of received signal strength, signal-to-noise ratio, packet error rate, timing information, control information, customized data package/function package, audio data, audio data synchronization information, and data indicating whether or not the audio data is received correctly.

8. The TWS earphones according to claim 6, wherein based on durations of the residual slots and the type of the interactive data, an RF frequency point of the interactive data and receiving and sending time points of the interactive data are determined.

9. A TWS earphone interaction system, comprising TWS earphones and an audio source,
wherein the audio source sends data packages to the TWS earphones,
wherein the TWS earphones comprise a main earphone and a secondary earphone,
wherein the main earphone and the secondary earphone are used for data interaction in one or more residual slots as follows:
1) When the main earphone and the secondary earphone receive a data packet sent by an audio source, the main earphone and the secondary earphone use a first residual slot of a data transmission slot, wherein the first residual slot is remaining of the data transmission slot after the data packet is transmitted;
2) When a data packet is received and the main earphone sends acknowledgment information to the audio source, the main earphone and the secondary earphone use a second residual slot of a first next data transmission slot, wherein the second residual slot is a remaining of the first next data transmission slot after the acknowledgment information is sent;
3) When a data packet is received and the main earphone sends acknowledgment information and extra information to the audio source, the main earphone and the secondary earphone use a third residual slot of a second next data transmission slot, wherein the third residual slot is a remaining of the second next data transmission slot after the acknowledgment information and the extra information is sent; and
4) When the main earphone does not receive audio data sent by the audio source correctly, the main earphone and the secondary earphone use a fourth residual slot which is a remaining of a third next data transmission slot;
wherein based on durations of the residual slots, and timing and period of interactive data transmitted between the main earphone and the secondary earphone, the interactive data is determined to be of a certain type.

* * * * *